United States Patent
Wilkey et al.

[11] Patent Number: 5,767,207
[45] Date of Patent: Jun. 16, 1998

[54] REMOVAL OF LITHIUM FROM POLYMER CEMENTS

[75] Inventors: John David Wilkey; Zaida Diaz, both of Houston, Tex.

[73] Assignee: Shell Oil Company, Houston, Tex.

[21] Appl. No.: 652,084

[22] Filed: May 23, 1996

Related U.S. Application Data

[60] Provisional application No. 60/009,514 Dec. 28, 1995.

[51] Int. Cl.[6] ............................................. C08F 6/02
[52] U.S. Cl. ................... 526/84; 528/502 A; 528/502 D
[58] Field of Search ................ 526/84; 528/502 A, 528/502 D

[56] References Cited

U.S. PATENT DOCUMENTS

| | | | |
|---|---|---|---|
| H1303 | 4/1994 | Miller et al. | 528/495 |
| 3,270,079 | 8/1966 | Schatz et al. | 260/680 |
| 3,862,066 | 1/1975 | Reiter et al. | 526/84 |
| 4,020,115 | 4/1977 | Hargis et al. | 260/632 |
| 4,587,330 | 5/1986 | Warfel et al. | 528/490 |
| 4,595,749 | 6/1986 | Hoxmeier | 528/483 |
| 5,166,277 | 11/1992 | Goodwin et al. | 525/338 |
| 5,177,297 | 1/1993 | Gibler | 585/823 |

FOREIGN PATENT DOCUMENTS

| | | | |
|---|---|---|---|
| 0186918 A2 | 7/1986 | European Pat. Off. | |
| 0358283 A2 | 3/1990 | European Pat. Off. | C08F 6/08 |
| 149073 | 10/1979 | Germany | C08F 6/08 |
| 153695 | 2/1983 | Germany | C08F 6/08 |
| 252293 A | 2/1983 | Germany | C08F 6/08 |
| 3520103 A1 | 11/1986 | Germany | C08F 6/00 |

*Primary Examiner*—Thomas R. Weber
*Attorney, Agent, or Firm*—Fredrik Marlowe

[57] ABSTRACT

A process for preparing a polymer cement which is relatively free of alkali metal salt by preparing the polymer cement with a polymerization terminating agent which is a diketone which leaves alkali metal salt in the cement which is readily removable by centrifugation.

6 Claims, No Drawings

REMOVAL OF LITHIUM FROM POLYMER CEMENTS

This application is a nonprovisional filing of U.S. provisional patent application Ser. No. 60/009,514, filed Dec. 28, 1995.

BACKGROUND OF THE INVENTION

1. Field of the Invention

This invention pertains to a process for separating alkali metal compounds from a polymer cement. More specifically, this invention pertains to a process for removing alkali metal compounds from a low-viscosity functionalized polymer cement.

2. Prior Art

Diene polymer cements containing highly basic lithium residues from the initiator (e.g., lithium methoxide) prove to be very difficult to hydrogenate. High levels of nickel/aluminum catalyst are required to thoroughly hydrogenate these materials. Previously it was found that removing the lithium methoxide by gravity settling or by filtration, allowed hydrogenation of the polymers with much lower levels of catalyst. Formation of lithium methoxide precipitate and settling from these cements is very slow, and effective removal may take weeks.

U.S. Pat. No. 5,166,277 to Goodwin and Willis, which is incorporated hereinto by reference, teaches the difficulty encountered in hydrogenating diene polymers in the presence of basic lithium salts. The patent discloses a process of methanol termination and settling.

SUMMARY OF THE INVENTION

It has now been discovered that judicious choice of polymerization terminating agents enables immediate removal of the lithium salt by centrifugation. Removal of the lithium salt has been shown to greatly enhance the hydrogenation process. Preferred terminating agents are those which form lithium salts which are less soluble in the cement than lithium methoxide. An example of terminating agents which are particularly effective are diketones such as 2,2,6,6-tetramethyl-heptane-3,5-dione.

DESCRIPTION OF PREFERRED EMBODIMENTS

Basic lithium salts such as lithium methoxide retard the hydrogenation of low molecular weight diene polymers. Removal of this salt has had the effect of greatly enhancing the hydrogenation process. The present invention represents an improvement over the prior art in that the salt may be removed immediately after termination, and lithium salts are removed to lower levels than is possible for lithium methoxide. Previously it was found that removing the lithium methoxide by gravity settling or by filtration allowed hydrogenation of the polymers with much lower levels of catalyst. Formation of lithium methoxide precipitate and settling from these cements is very slow and may take weeks. In accordance with the present invention it has been found that judicious choice of polymerization terminating agents enables immediate removal of the lithium salt by centrifugation. Preferred terminating agents are those which form lithium salts which are less soluble in the cement than lithium methoxide. Some examples of terminating agents which are particularly effective are 2-ethylhexanoic acid, 1,2-hydroxy stearic acid, oxalic acid, benzoic acid, succinic acid and diketone.

During separation of the lithium or other alkali metal compounds, the polymer may be present in a solvent at a concentration within the range of from about 5 to about 80 weight percent, based on total solution, and the alkali metal compound, such as lithium, may be present at a concentration within the range from about 0.005 to 5 wt % based on the polymer. Contact between the polymer and the terminating agent preferably occurs at a temperature within the range of 20° to 100° C., at a pressure up to 80 psig and at a nominal holding time within the range of 20 minutes to 4 hours. Where suitable, where the polymer is liquid, has low viscosity, and low molecular weight, the polymer may be used without a solvent.

The method of this invention can be used to separate alkali metal compounds such as lithium compounds from polymers such as low-viscosity functionalized polymer cements (A description of how these polymers can be made follows hereinafter.) The polymer may be hydrogenated or not during the alkali metal separation, but it is preferable to separate lithium compounds prior to hydrogenation.

Polymer solvents include but are not limited to hydrocarbons such as paraffins, cycloparaffins, alkyl substituted cycloparaffins, aromatics and alkyl substituted aromatics, such as benzene, toluene, cyclohexane, methyl cyclohexane, n-butane, n-hexane, n-heptane and the like. Ethers, such as diethyl ether, tetrahydrofuran, and the like can be used. Mixtures of the foregoing can be removed and another solvent substituted.

Centrifugation may be combined with other types of separation, e.g. filtration, settling and decantation.

Any alkali metal compound commonly found in a polymer solution when an alkali metal compound is used as the catalyst or initiator can be separated from the polymer. These include alkali metal hydrides, alkali metal alkoxides and alkali metal hydroxides.

Low Viscosity Functionalized Polymer Cements

Low viscosity functionalized polymer diols can be made in accordance with the following procedure:

Anionic polymerization of conjugated diene hydrocarbons with lithium initiators is well known as described in U.S. Pat. Nos. 4,039,503 and Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

X-B-Li
X-A-B-Li
X-A-B-A-Li
Li-B-Y-B-Li
Li-A-B-Y-B-A-Li wherein B represents polymerized units of one or more conjugated diene hydrocarbons such as butadiene or isoprene. A represents polymerized units of one or more vinyl aromatic compounds such as styrene. X is the residue of a monolithium initiator such as sec-butyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation.

Dilithium initiation with the diadduct of sec-butyllithium (s-BuLi) and m-diisopropenylbenzene also requires presence of a non-reactive coordinating agent such as diethyl ether, glyme, or triethyl amine, otherwise monolithium initiation is achieved. Ether is typically present during anionic polymerization as discussed above, and the amount of ether typically needed to obtain specific polymeric structures has been sufficient to provide dilithium initiation.

Alternatively, anionic polymerization of conjugated dienes may be performed using protected functional initiators (PFI) as described in U.S. Pat. Nos. 5,391,663 and 5,146,168 which are incorporated herein by reference.

Anionic polymerization is often terminated by addition of water to remove the lithium as lithium hydroxide (LiOH) or by addition of an alcohol (ROH) to remove the lithium as a lithium alkoxide (LiOR). For polymers having terminal functional groups, the living polymer chains are preferably terminated with hydroxyl, carboxyl, phenol, epoxy or amine groups by reaction with ethylene oxide, carbon dioxide, a protected hydroxystyrene monomer, ethylene oxide plus epichlorohydrin, or the amine compounds listed in U.S. Pat. No. 4,791,174, respectively.

The termination of living anionic polymers to form functional end groups is described in U.S. Pat. Nos. 4,417,029, 4,518,753 and 4,753,991 which are herein incorporated by reference. Of particular interest for the present invention are terminal hydroxyl, carboxyl, phenol, epoxy and amine groups. Such polymers with number average molecular weights between about 1000 and 20,000 as measured by gel permeation chromatography are low viscosity functionalized polymers.

Hydrogenation of at least 90%, preferably at least 95%, of the unsaturation in low molecular weight butadiene polymers is achieved with nickel catalysts as described in U.S. Pat. Nos. Re. 27,145 and 4,970,254 which are incorporated by reference herein. The preferred catalyst is a mixture of nickel 2-ethylhexanoate and triethylaluminum.

The termination step can result in release of fine particles of lithium bases as described in U.S. Pat. No. 5,166,277 which is incorporated by reference herein. The lithium bases may interfere with hydrogenation of the polymer and preferably are removed, especially if the hydrogenation is to be carried out at high solids.

EXAMPLES

Example 1

For purposes of comparison, a diol cement containing 1130 ppm Li was synthesized and terminated with methanol. A one gallon aliquot of the solution was allowed to sit undisturbed for 19 days, at which time testing of the supernatant solution indicated a lithium content of 320 ppm Li, for 72% removal efficiency by settling. For the present invention, greater removal efficiencies were achieved in shorter periods of time by a combination of the preferred termination agents and centrifugation.

Example 2

Acids and a diketone were screened to determine successful polymer cement terminating agents. Best results were obtained with oxalic acid, benzoic acid and 1,2-hydroxystearic acid. These acids are solids so a process is envisioned where the cement is passed through a bed or cartridge of the solid acid to remove lithium. The following table is relevant to lithium (ppm) remaining in a cement (a PFI diol having 20% solids and 4000 molecular weight) after termination with various agents. After the allowed settling time, the supernatants were centrifuged at 5000 g-minutes.

TABLE

LITHIUM (ppm) REMAINING IN A PFI CEMENT AFTER TERMINATION WITH VARIOUS AGENTS
Contact: 1 hr; Settling temperature: 23° C.

| Initial Li (ppm) | Terminating Agent | Terminating Agent/Li (m/m) | Settling (hr) | 5000 g-min*** |
|---|---|---|---|---|
| 478 | Acetic acid | 1.7 | 18 | 283 |
| 545 | Oxalic acid | 1.5 | 16 | less than 3 |
| 545 | Benzoic acid | 1.5 | 16 | less than 3 |
| 545 | 12HSA* | 1.5 | 16 | 7 |
| 545 | Succinic acid | 1.5 | 16 | 160 |
| 545 | diketone | 0.7 | 16 | 100 |

*12-hydroxystearic acid
**molar ratio of terminating agent to lithium
***Parts per million of lithium in the cement after centrifugation

We claim:

1. A process for removing alkali metal compounds from a polymer cement comprising:

preparing the polymer cement with a polymerization terminating agent which is a diketone which leaves a removable alkali metal salt in the cement; and removing the alkali metal salt from the polymer cement.

2. The process of claim 1 wherein the alkali metal is lithium.

3. The process of claim 1 wherein the polymer cement is functionalized mono-ol or diol having a number average molecular weight between 1000 and 20,000.

4. The process of claim 1 wherein the terminating agent is 2,2,6,6-tetramethyl-heptane-3,5-dione.

5. The process of claim 1 wherein the alkali metal salt is removed from the polymer cement by centrifugation.

6. The process of claim 1 wherein the alkali metal salt is removed from the polymer cement by filtration.

* * * * *